Patented June 19, 1951

2,557,326

UNITED STATES PATENT OFFICE 2,557,326

PURIFICATION AND RECOVERY OF CRYSTALS OF METAL SALTS

Sidney B. Tuwiner, Baldwin, N. Y., assignor to Phelps Dodge Corporation, New York, N. Y., a corporation of New York No Drawing. Application March 12, 1946, Serial No. 653,946

4 Claims. (Cl. 23—125)

This invention relates to the formation, purification and recovery of crystals and more particularly to the formation, transformation, purification and recovery of crystals of metal salts which are capable of combining with water in molecular form and forming a plurality of hydrates.

An object of this invention is to purify crystals of metal salts capable of existing as crystals in two or more stages of hydration in the presence of a saturated solution of the metal salt.

Another object of this invention is to form and recover crystals of metal salts of substantially any desired size economically and efficiently.

Another object of this invention is to recover from minimum volume, the maximum yield of crystalline materials which are capable of crysstallizing from a water solution in a plurality of hydrates.

Another object of this invention is to form crystals of a metal salt, from a mixture containing the metal salt and small insoluble particles, of a size sufficient to form interstitial spaces when formed in a bed for the passage of the insoluble materials therethrough.

Another object of this invention is to separate crystallizable substances capable of forming a plurality of hydrates from a liquid containing the crystallizable substances and insoluble, relatively finely divided materials.

A more particular object of this invention is to obtain a maximum amount of zinc in the form of zinc sulfate crystals from a fume containing zinc or zinc salts.

One of the methods most frequently used for the purification of crystals of metal salts is to prepare a saturated solution of the metal salt at the temperature of maximum solubility and cool the solution to room temperature. For example, zinc sulfate crystals are customarily purified by preparing a saturated solution of the zinc sulfate at a temperature of about 60° C. and cooling the saturated solution to room temperature whereby a relatively large yield of crystals per unit volume of mother liquor is obtained.

In accordance with this invention, crystals of metal salts which form a plurality of hydrates are purified to substantially the same degree or greater and with yields of 3 to 4 times per unit volume of mother liquor, than those resulting from the practice of purification by the conventional method of crystallization.

The method of purification of this invention is particularly applicable to the recovery and purification of crystals of metal salts which are contained in mixtures of finely divided insoluble materials, such as those involved in the recovery and purification of zinc sulfate obtained from bag house fumes. The method of purification of crystals of metal salts in accordance with this invention comprises heating a magma containing the metal salt crystals in a higher hydrate and a saturated solution of the metal salt to a temperature above the transition temperature at which the metal salt is converted from one hydrate to another hydrate. The period of heating is sufficient to convert substantially completely the crystals of the higher hydrate to the lower hydrate. In this step, the crystals of the higher hydrate of the metal salt are dissolved in the saturated solution of the metal salt with the simultaneous crystallization of the lower hydrate of the metal salt. The magma is then cooled to a temperature below the transition temperature, the rate of cooling through the transition temperature being such that the transformation from the lower hydrate of the metal salt to the higher hydrate of the metal salt is accomplished by dissolution of the lower hydrate accompanied by simultaneous crystallization of the higher hydrate from the solution. The net result of this second step is to reconvert the lower hydrate of the metal salt to the higher hydrate of the metal salt, and during this second step of the process the lower hydrate of the metal salt is substantially completely dissolved and the higher hydrate of the metal salt is simultaneously crystallized. In this process of conversion of the higher hydrate to the lower hydrate with the subsequent reconversion to the higher hydrated form, a material amount of the impurities are removed from the crystals of the metal salt initially heated. After the metal salts in the higher hydrate have been reconverted, they may be separated from the mother liquor by any conventional method such as filtration, decantation or centrifugation. When the crystals of the metal salts are contained in a magma having material amounts of finely divided small particles, the crystals may be separated by the method described in applicant's copending application S. N. 529,038, filed March 31, 1944, now abandoned.

When crystals are separated by the process described in this copending application, they are desirably relatively uniform and of a size which, when in the form of a bed on a screen, provide interstitial spaces sufficiently large for the insoluble materials to pass through. Desirably, too, such crystals are as small as possible so that the maximum amount of occluded insoluble are contained in them.

The method in accordance with this invention is applicable to metal salts which exists in two or more stages of hydration in the presence of a saturated solution regardless of the nature of the impurities, such as the finely divided insoluble particles.

Certain metal salts exist in two or more stages of hydration in the presence of saturated solution. For such salts there exists certain so-called transition periods, i. e., temperatures at which two such hydrates or a hydrate and an anhydrous salt exist in equilibrium with the solution. This transition temperature or temperatures may be ascertained by means of one of its most significant characteristics. A slight increase in the temperature at the transition results in the transformation of all of the more highly hydrated phase into that which is less highly hydrated. Conversely, a slight drop in temperature at the transition temperature causes the reverse transformation. For example, zinc sulfate in a water solution manifests a transformation at 38° C. and at 60° C. Below 38° C. zinc heptahydrate is stable. Between 38° and 60° C. zinc hexahydrate is stable, while above 60° C. zinc monohydrate is stable. The transition temperature 60° C. also marks the point of maximum solubility of zinc sulfate in water, the zinc monohydrate showing diminishing solubility with a temperature rise above that point.

The method in accordance with this invention is particularly applicable in the recovery of metals from a fume containing the metal. In this recovery process, the metal is obtained in the form of crystals of a salt of the metal capable of forming a plurality of hydrates, and by the purification method of this invention, the maximum yield of relatively pure metal salt crystals are obtained efficiently and economically. A pulp of such metal salt is first formed, desirably at the temperature above that of the transition point between a higher and lower hydrate. The concentration of the pulp, if it contains material amounts of insoluble substances, such as may be found in zinc baghouse fume, is desirably such that, when the crystals of metal salts are formed therein, these crystals are substantially uniformly suspended throughout the mass of the mixture. The crystals of the desired metal salt may be formed directly from an insoluble compound of the metal in a pulp, the concentration of which being such that crystals form up the addition of the required acid, such as sulfuric acid. The mixture or pulp containing crystals of the desired salt is then cooled rapidly to the transition temperature at which the metal salt is converted from one hydrate to another hydrate or from the anhydrous form to a hydrated form. The rate of cooling is such that the transformation from the lower hydrate to the higher hydrate is accompanied by dissolution of the lower hydrate and simultaneous crystallization of the higher hydrate. If the metal salt has more than two forms, it is ordinarily desirable to cool rapidly the solution to the transition temperature at which the metal salt is converted to the form containing the maximum amount of water. Frequently, the transition temperature is above that at which separation is effected. Consequently, after the crystals have been formed and the temperature of the mixture is below the transition temperature, no further temperature control is necessary in the separation step. The crystals obtained are relatively uniform in size and are relatively pure due to the substantially complete dissolution of the lower hydrate, which results in the freeing of impurities, and the simultaneous crystallization of the higher hydrate without the occlusion of a substantial portion of the impurities. Within the limitation of effecting substantially completely the dissolution of the lower hydrate in the saturated solution of the metal salt and simultaneously crystallizing a higher hydrate by control of the rate of cooling, crystals of a desired size may be obtained by the practice of this invention. If relatively large crystals are desired, the substantially saturated solution is maintained at the transition temperature for a prolonged period. On the other hand, if especially fine crystals are desired, the solution is cooled very rapidly through the transition temperature; and preferably intense agitation of the solution is effected to produce the maximum number of crystal nuclei. If desired, the crystals may then be separated from the mother liquor, or from other substantially smaller insoluble materials contained in the liquor if large crystals are formed. Crystals of metallic salts, for example, may be produced in a liquor containing substantial amounts of insoluble matter and the size of these crystals controlled so that, when separated by means of a screen or other separating means, the interstitial spaces provided between the crystals are sufficient for the insoluble material to pass through readily without caking to be separated in accordance with the method described in the copending application S. N. 529,038, filed March 31, 1944. Also, the crystals, while sufficiently large to result in the desired interstitial spaces, can be made sufficiently small due to their uniformity to prevent any substantial occlusion of the insoluble matter in their formation. With the requirements of the size of the crystals determined, crystals of any desired size may be produced within the limitations of rate of cooling through the transition temperature as heretofore described.

A more comprehensive understanding of this invention is obtained by reference to the following examples:

*Example 1.—Preparation of zinc sulfate from bag house fumes*

A slurry having an average specific gravity of approximately 1.585 and containing 13 to 15% by weight of insoluble tin, lead, copper and iron salts and obtained from a bag house fume from which zinc has been substantially removed by the method herein described was mixed with bag house fume obtained as a by-product of the smelting of copper in the proportion of 2764 lbs. of return liquor to every 1000 lbs. of fume and charged into a crystallizer. The bag house fume contained the following:

| | Per cent |
|---|---|
| Zinc | 50.16 |
| Tin | 1.904 |
| Iron | .096 |
| Lead | 6.17 |
| Copper | 0.73 |
| Sulfate as $H_2SO_4$ | 31.59 |

About 303 lbs. of water to 1000 lbs. of fume was then added to obtain a pulp of sufficient fluidity. Thereafter, concentrated sulfuric acid (66° Bé.) was added and the temperature of the mixture held to a maximum of about 60° C. and an optimum of about 50° C. Sufficient sulfuric acid was added until the pH had reached about 4.15 at this temperature. At these concentrations, the acid reacted directly with the fume of the charge to form very fine zinc hexahydrate crystals $$(ZnSO_4 \cdot 6H_2O)$$

so that at no time did the zinc content of the fume form a complete solution in the crystallizer. After the sulfuric acid had been completely added, the mixture was cooled to the transition point from the zinc hexahydrate to the zinc heptahydrate which occurred at about 38° C. This cooling to the transition point may be performed rapidly. When the transition temperature was reached, the solution was maintained at that temperature for a relatively prolonged period, depending upon the size of the crystals desired. When the control time has elapsed, the cooling may be continued rapidly if desired until room temperature is reached. Desirably, this control time should be about two hours. The final magma averaged by weight approximately 46.5% zinc heptahydrate crystals and 53.5% mother liquor and suspended insolubles, the pH having risen to an optimum of approximately 5. The specific gravity of the magma averaged 1.825 and the mother liquor and insolubles approximately 1.72. On the average, 1000 lbs. of fume might be charged into a crystallizer with a capacity of 295 gallons, and from this crystallization there was obtained 2094 lbs. of crystals and 2407 lbs. of mother liquor and insolubles.

The purpose in utilizing the process of this invention with the fume is to provide a means of purifying the zinc sulfate and separating zinc sulfate from the other materials contained in the fume. Solutions containing a large amount of insolubles have been employed to separate more effectively the resulting zinc sulfate crystals as described in the copending application, S. N. 529,038, filed March 31, 1944. The concentrated solutions employed in the process described in this example resulted in a mother liquor of sufficiently high specific gravity so that the crystals are in practically permanent suspension in the magma. Under these conditions the agitation rate during crystallization is maintained very low and the size of the crystals easily controlled, so that their separation from the mother liquor and insolubles are conducted quite effectively on a standard centrifuge apparatus. After passing through the centrifuge, the crystals of zinc heptahydrate averaged approximately 0.8% total insolubles.

In order to build up the specific gravity of the mother liquor returned to the crystallizer, about ¾ of the mother liquor and wash from the crystal centrifuge was returned to the crystallizer without removal of its insolubles and ¼ passed through a continuous centrifuge to remove the insolubles. The charge to the continuous centrifuge was treated with sulfuric acid (66° Bé.) to reduce the pH to about 3.5 and diluted with approximately ⅓ its weight in water in order to process it more effectively in the centrifuge. At a pH below 3.5 a continuous solid bowl centrifuge yielded a cake containing approximately 50% moisture and a liquor containing about 0.5% insolubles which might, if desired, be returned to the first crystallizer. The crystals of zinc sulfate heptahydrate obtained in this process are purified by any well known method.

A solution of the zinc sulfate hexahydrate crystals was prepared and the resulting solution was then passed to a crystallizer. If it was desired to make monohydrate zinc sulfate crystals, clarified liquor was continuously fed in and evaporated until the magma in the crystallizer reached a thickness beyond which it was not practical to operate. At this point the crystallizer was discharged hot at a temperature above 60° C. to a centrifuge and the monohydrate crystals filtered out, the mother liquor being returned partly to the clarifier and partly to the first crystallizer centrifuge. In practice it was found that 100 gallons of clarified liquor could be reduced in the crystallizer to approximately 29 gallons of monohydrated crystals in hot mother liquor before it was necessary to discharge and centrifuge. If it was desired to produce zinc heptahydrate crystals, the evaporation was terminated at an earlier point and the batch cooled very slowly down to room temperature to produce the zinc heptahydrate which was then passed through the centrifuge in a manner similar to that of the zinc monohydrate liquors.

*Example 2.—Purification of copper sulfate pentahydrate crystals*

Copper sulfate crystals of a crystal size unsuited for salability were mixed in the proportion of 4 parts of crystals to one part of a saturated water solution of copper sulfate. This mixture was heated to a temperature above 96° C. The solution was then cooled relatively rapidly to 96° C. and maintained at this temperature for a period sufficient to assure substantial complete dissolution of copper sulfate trihydrate and simultaneous crystallisation of copper sulfate pentahydrate. After this period, the solution was cooled to room temperature and the crystals separated from the mother liquor by any suitable separating means, such as a centrifuge or a screen which retained the crystals.

If it is desired to produce extremely fine crystals corresponding to material ordinarily obtained by pulverization, the solution of copper sulfate prepared from the saturated solution of copper sulfate and the crystals in the proportion of 4 parts crystals to one part of saturated copper sulfate solution is heated above 96° C. to effect solution of the crystals. The resulting solution is permitted to cool to 96° C. At that temperature it is rapidly cooled while intensely agitated. This action produces the maximum number of crystalline nuclei and extremely fine crystals of copper sulfate pentahydrate are formed. If desired, these crystals may be separated from the mother liquor by filtration.

*Example 3.—Purification of copper sulfate pentahydrate crystals*

To a 30 gallon batch crystallizing tank equipped with an agitator and heating and cooling coils were added 61.5 lbs. of water, 345 lbs. of copper sulfate pentahydrate crystals containing .065% iron and .140% nickel. This mixture was heated to a temperature slightly in excess of 96° C., and preferably to a temperature of about 98° C. During the heating, the mixture was agitated to keep the undissolved crystals in suspension until the copper sulfate pentahydrate crystals were converted to copper sulfate trihydrate. The maximum solubility at 96° C. of copper sulfate (anhydrous) in 61.5 lbs. of water is about 129 lbs. The mixture was then cooled slowly for a period of three hours through the transition temperature to about 92.5° C. Thereafter, it was cooled rapidly to 40° C. and then centrifuged. About 317.5 lbs. of copper sulfate pentahydrate crystals containing .034% iron and .037% nickel were obtained. The quantity of the mother liquor resulting was 78.75 lbs. containing about 27.5 lbs. of copper sulfate (calculated as copper sulfate pentahydrate) and 51.25 lbs. of free water. The loss of about 10 lbs. of water was due to evaporation. The mother liquor contained about .149% iron and .465% nickel. The mesh size of the copper sulfate pentahydrate crystals was as follows:

+14 mesh = 0.96%
−14+20 mesh = 9.11%
−20+28 mesh = 44.92%
−28+35 mesh = 30.37%
−35+40 mesh = 3.29%
−40+48 mesh = 5.82%
−48+70 mesh = 4.30%
−70 mesh = 1,19%

While the transition temperature of zinc sulfate in its different hydrated form was given herein as 38° C. and 60° C. and that of copper sulfate as 96° C., variations in these temperatures occur in solutions of these salts depending upon the nature and concentration of impurities contained therein.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The process of recovering zinc values from a solid metallurgical fume comprising chiefly zinc and substantial quantities of water insoluble compounds of other metals, said process comprising adding said fume to a saturated solution of zinc sulfate, treating the resulting mixture, while maintaining the temperature between 38° C. and 60° C., with sufficient concentrated sulfuric acid to convert the zinc values in said fume to zinc sulfate hexahydrate crystals without any substantial solubilizing of the zinc sulphate formed, cooling the mixture to the transition temperature at which zinc sulfate hexahydrate is converted to zinc sulfate heptahydrate, further cooling the resulting mixture through the transition temperature at a rate to convert substantially completely said zinc sulfate hexahydrate to said zinc sulfate heptahydrate, separating the resulting zinc sulfate heptahydrate from the mother liquor containing said water insoluble compounds and recycling a portion of the mother liquor containing said water insoluble compounds for the treatment of a fresh batch of said metallurgical fume.

2. The process of recovering zinc values from a solid metallurgical fume comprising chiefly zinc and substantial quantities of water insoluble compounds of other metals, said process comprising adding said fume to a saturated solution of zinc sulfate, treating the resulting mixture, while maintaining the temperature between 38° C. and 60° C., with sufficient concentrated sulfuric acid to convert the zinc values in said fume to zinc sulfate hexahydrate crystals without any substantial solubilizing of the zinc sulphate formed, cooling the mixture to the transition temperature at which zinc sulfate hexahydrate is converted to zinc sulfate heptahydrate, further cooling and agitating the resulting mixture through the transition temperature at a rate to convert substantially completely said zinc sulfate hexahydrate to said zinc sulfate heptahydrate, separating the resulting zinc sulfate heptahydrate from the mother liquor containing said water insoluble compounds, recycling a portion of the mother liquor containing said water insoluble compounds for the treatment of a fresh batch of said metallurgical fume, treating the remainder of said mother liquor containing said water insoluble compounds with sulfuric acid to reduce the pH to below 3.5, separating said water insoluble compounds and recycling the separated liquor for the treatment of a fresh batch of said metallurgical fume.

3. The process of recovering zinc values from a solid metallurgical fume comprising chiefly zinc and substantial quantities of water insoluble compounds of other metals, said process comprising adding said fume to a saturated solution of zinc sulfate, treating the resulting mixture, while maintaining the temperature at about 50° C., with sufficient concentrated sulfuric acid until the mixture has attained a pH of about 4.15 to convert the zinc values in said fume to zinc sulphate hexahydrate crystals without any substantial solubilizing of the zinc sulphate formed, cooling the mixture to the transition temperature at which zinc sulfate hexahydrate is converted to zinc sulfate heptahydrate, further cooling and agitating the resulting mixture through the transition temperature for a period of about 2 hours to convert substantially completely said zinc sulfate hexahydrate to said zinc sulfate heptahydrate, separating the resulting zinc sulfate heptahydrate from the mother liquor containing said water insoluble compounds, recycling about ¾ of the mother liquor containing said water insoluble compounds for the treatment of a fresh batch of said metallurgical fume, treating the remainder of said mother liquor containing said water insoluble compounds with sulfuric acid to reduce the pH to about 3.5, separating said water insoluble compounds and recycling the separated liquor for the treatment of a fresh batch of said metallurgical fume.

4. The process of recovering zinc values from a solid metallurgical fume comprising chiefly zinc and substantial quantities of water insoluble compounds of other metals, said process comprising adding said fume to a saturated solution of zinc sulfate, treating the resulting mixture, while maintaining the temperature above 38° C., with sufficient concentrated sulfuric acid to convert the zinc values in said fume to zinc sulfate crystals without any substantial solubilizing of the zinc sulfate formed, cooling the mixture to the transition temperature at which zinc sulfate hexahydrate is converted to zinc sulfate heptahydrate, further cooling the resulting mixture through the transition temperature at a rate to convert substantially completely zinc sulfate hexahydrate to zinc sulfate heptahydrate, separating the resulting zinc sulfate heptahydrate from the mother liquor containing said water insoluble compounds and recycling a portion of the mother liquor containing said water insoluble compounds for the treatment of a fresh batch of said metallurgical fume.

SIDNEY B. TUWINER.

REFERENCES CITED

The following references are of record in the file of this patent:

UNITED STATES PATENTS

| Number | Name | Date |
| --- | --- | --- |
| 1,413,045 | MacCarthy | Apr. 18, 1922 |
| 1,415,797 | Christenson | May 9, 1922 |

(Other references on following page)

UNITED STATES PATENTS

| Number | Name | Date |
|---|---|---|
| 1,434,084 | Christenson | Oct. 31, 1922 |
| 2,127,496 | Waldeck | Aug. 23, 1938 |
| 2,316,343 | Kubelka | Apr. 13, 1943 |

FOREIGN PATENTS

| Number | Country | Date |
|---|---|---|
| 390,787 | Germany | Feb. 23, 1924 |

OTHER REFERENCES

Mellor, Comprehensive Treatise on Inorganic and Theoretical Chem., vol. I (1922), pages 513–4; vol. IV (1923), page 614, Longmans, Green & Co., London.

Taylor, A Treatise on Physical Chemistry, vol. I, pages 545–549, Sec. ed. (1931).

Seidell, Solubility of Inorganic and Organic Compounds, vol. 2 (1928), page 1498, Van Nostrand Co.